(12) United States Patent
Dygert et al.

(10) Patent No.: US 9,567,128 B2
(45) Date of Patent: Feb. 14, 2017

(54) WIDE MOUTH CONTAINER AND METHOD OF MAKING THE SAME

(75) Inventors: Douglas Dygert, Olive Branch, MS (US); Dan Gamber, Lakeland, TN (US)

(73) Assignee: Ring Container Technologies, Oakland, TN (US)

( * ) Notice: Subject to any disclaimer, the term of this patent is extended or adjusted under 35 U.S.C. 154(b) by 174 days.

(21) Appl. No.: 13/315,910

(22) Filed: Dec. 9, 2011

(65) Prior Publication Data

US 2012/0199547 A1 Aug. 9, 2012

Related U.S. Application Data

(60) Provisional application No. 61/421,370, filed on Dec. 9, 2010.

(51) Int. Cl.
| | | |
|---|---|---|
| *B65D 1/02* | (2006.01) | |
| *B65D 1/10* | (2006.01) | |
| *B65D 1/46* | (2006.01) | |
| B29L 31/00 | (2006.01) | |
| B29C 49/06 | (2006.01) | |
| B29K 67/00 | (2006.01) | |

(52) U.S. Cl.
CPC . *B65D 1/10* (2013.01); *B65D 1/46* (2013.01); *B29B 2911/14606* (2013.01); *B29B 2911/14666* (2013.01); *B29C 49/06* (2013.01); *B29C 2791/001* (2013.01); *B29C 2793/009* (2013.01); *B29C 2793/0027* (2013.01); *B29K 2067/003* (2013.01); *B29L 2031/716* (2013.01)

(58) Field of Classification Search
None
See application file for complete search history.

(56) References Cited

U.S. PATENT DOCUMENTS

| | | | | |
|---|---|---|---|---|
| 4,140,468 | A | * | 2/1979 | Duga .................... B29C 49/062 425/534 |
| 4,199,629 | A | * | 4/1980 | Agrawal et al. ............. 428/35.1 |
| 4,305,904 | A | * | 12/1981 | Black ..................... B29C 49/72 225/99 |
| 4,618,515 | A | * | 10/1986 | Collette .............. B29C 49/6445 215/379 |
| 5,617,768 | A | * | 4/1997 | Palazzolo ......................... 82/47 |
| 5,679,306 | A | * | 10/1997 | Nakajima et al. ............ 264/520 |
| 7,364,045 | B2 | * | 4/2008 | Dygert et al. ................. 215/44 |
| 2002/0017502 | A1 | * | 2/2002 | Renz ............................. 215/384 |

* cited by examiner

*Primary Examiner* — Monica Huson
(74) *Attorney, Agent, or Firm* — Sorell Lenna & Schmidt, LLP

(57) ABSTRACT

A container and a method for making a container are provided. The method includes injection molding a preform having a body forming region, a neck forming region, and a dome forming region. After forming the preform, the preform is mounted in a mold having a surface, the mold surface having a neck forming surface to form a neck having a snap fit portion or a threaded portion. After mounting the preform, the preform is stretched against the mold surface to form an intermediate article having a dome portion connected to a neck portion of the container. Thereafter, the dome portion is severed from the neck portion to produce a wide mouth container, wherein the ratio of a wall thickness of the neck forming region of the preform to the wall thickness of the neck portion is ranges from 4.8 to 7.

20 Claims, 6 Drawing Sheets

WIDE MOUTH CONTAINER AND METHOD OF MAKING THE SAME

This application claims the benefit of U.S. Provisional Patent Application No. 61/421,370 filed on Dec. 9, 2010 in the U.S. Patent Trademark Office, the disclosure of which is incorporated herein in its entirety by reference.

BACKGROUND OF THE INVENTION

1. Field of the Invention

Apparatuses and methods consistent with the present invention relate to a wide mount polyethylene terephythalate (PET) container and a method for making the same.

2. Description of the Related Art

Wide mouth bottles having threaded necks typically have neck finishes larger than 48 mm in diameter, and the majority of those bottles are produced on single stage injection mold equipment. This equipment is well suited for low volume applications primarily because the slower injection process is the determining factor in cycle time. For high volume applications two-stage PET equipment has been developed to make preforms having the desired finished threaded neck configuration in a separate injection molding machine and then reheating and blowing the preforms in another blowing machine. FIG. 5 shows a preform having the finished thread finished superimposed on a bottle produced using the preform. However, in this arrangement the blowing machine can out-produce the injection machine and preform inventories must be carefully monitored to keep an adequate supply for the blowing machine. This imbalance is compounded when two-stage equipment is used in wide mouth applications. This is primarily due to the size of the preform/neck finish and the physical size of the injection mold.

The single stage blow molding process combines the injection of the preform and blowing of the container into one machine. These machines have an extruder that melts the resin pellets and injects the molten resin into a mold to form the preform. The preform is then transferred to a conditioning station that either adds or removes heat from areas of the preform to help with forming the container. In some machines such as an Aoki, the conditioning station is eliminated and the preform design is the only factor used to determine material placement in the container. After the conditioning station, the preform is transferred to the blow station where the container is formed. The last operation is removing the container from the machine. This can be done in a fourth station as in a Nissei and Sipa or directly from the blow station as in Uniloy USB machines. In all one stage machines, the injection time determines the overall cycle time.

The size of the injection platen (preform neck diameter) and blow mold platen determine the maximum container size. On containers with small finishes (preform neck diameter), the container diameter determines how many will fit on the blow platen. Once the finish becomes large enough, the number of cavities is determined by how many preforms will fit into the injection station. Usually, more containers of a given body diameter can be produced if the finish diameter is reduced. By using the Trim-Lite process on a single stage machine, the finish size is kept small enough to allow the container diameter to determine the maximum number that can be produced in a single cycle.

In other words, although wide mouth PET containers can be manufactured on single stage PET blow molding machine, the number of mold cavities possible is wholly dependent on the diameter of the neck finish of the preform.

For example, when running a 155 mm diameter canister, the maximum cavitation on the existing machinery was limited to 2 (this represents the number of units that may be blow molded at one time). Note the large diameter of the threaded portion of the typical preform as shown in FIG. 5. Secondly, the neck (as with all single stage injected molded preforms) would have been solid plastic and would contribute a large portion to the overall bottle weight.

The finish diameter also affects the design of the preform and the material distribution in the blown container. As the finish diameter increased, the preform takes on a flatter, disc like shape resulting in less desirable stretching characteristics. A smaller finish allows the preform design to be more cylindrical which provides for better stretching characteristics.

Notably, when using the one stage blow molding process, the heat from the injection process is maintained in the preform. Thus, the preform is not cooled into a solid state. This means that the one stage preform is generally heated throughout more than the two stage preform prior to blowing. Because of the one stage preform having more internal heat, it can form small details better than the two stage process. The two stage process on the other hand due to it having less internal heat develops more stress hardening of the material and produces a stronger container for a given design. However, because the neck finish of wide mount containers is large, the number of mold cavities in the one stage blow molding machine is limited due to the available space. Thus, there is a need to for an improved method for making wide mouth PET containers.

SUMMARY OF THE INVENTION

Aspects of the invention relate to a blow-molded PET container and a method of making the same.

According to a first aspect of the invention, a method is provided for making a blow-molded PET plastic container having an externally threaded or snap fit wide-mouth finish. The method comprises injection molding a preform having a body forming region, a neck forming region above the body forming region, and a dome forming region above the neck forming region. After forming the preform, the preform is mounted in a mold having a surface, the mold surface having a neck forming surface to form a neck having a snap fit portion or a threaded portion. After mounting the preform, the preform is stretched against the mold surface to form an intermediate article having a dome portion connected to a neck portion of the container. Thereafter, the dome portion is severed from the neck portion to produce a wide mouth container, wherein the ratio of a wall thickness of the neck forming region of the preform to the wall thickness of the neck portion is ranges from 4.8 to 7.

According to another aspect, the ratio of the diameter of the neck region of the preform to the diameter of the container neck is approximately 1.85 to 1.95. Also, the difference between the diameter of the neck forming region and the neck portion ranges from 2.5 to 3.5 inches and a thickness of the neck portion lies in the range of 0.029 to 0.020 inches.

According to another aspect of the invention, a method is provided for making a blow-molded PET plastic container having an externally threaded or snap fit wide-mouth finish. The method comprises injection molding a preform having a body forming region, a neck forming region above the body forming region, and a dome forming region above the neck forming region. After forming the preform, the preform is mounted in a mold having a surface, the mold surface having a neck forming surface to form a neck having a snap fit portion or a threaded portion. After mounting the preform, the preform is stretched against the mold surface to form an intermediate article having a dome portion connected to a neck portion of the container, a wall thickness of the snap fit neck portion being within the range of 0.029 to 0.020 inches. Thereafter, the dome portion is severed from the neck portion to produce a wide mouth container, wherein the ratio of the diameter of the snap fit forming region of the preform to the diameter of the snap fit neck portion is in the range of 1.85 to 1.95.

According to another aspect, the difference between the diameter of the neck forming region and the neck portion ranges from 2.5 to 3.5 inches.

According to another aspect, the preform is stretched against the mold surface directly after injection molding the preform, wherein some of the residual heat from the injection molding process is maintained in the preform.

According to another aspects, a wide-mouth PET container is provided. The container comprises a body portion; and a neck portion having a thread or snap fit portion formed thereon. The thickness of the neck portion ranges from 0.029 to 0.020 inches. The diameter of the neck portion is equal to or larger than a maximum diameter of the body portion.

BRIEF DESCRIPTION OF THE DRAWINGS

The above and other aspects and features of the various aspects of the present invention will become more apparent by describing in detail exemplary embodiments thereof with reference to the attached drawings in which.

DETAILED DESCRIPTION OF THE INVENTION

A PET container and a method of forming the PET container according to the various aspect of the invention are described below with reference to embodiments in conjunction with the accompanying drawings. However, the present invention is not limited to the embodiments described below.

Using single stage blow molding design and techniques, a preform in accord with this embodiment was designed to run containers having a dome. These preforms were unit cavity tested to ensure the weight and necessary neck finish dimensions were met. After successful unit cavity testing a preform design changes a four cavity production mold was built. This part requires that the top dome section undergo a spin trim operation to remove the dome from the bottle prior to use. It is noted that the present invention is not limited to single stage blow molding units, but may be performed on a two stage process where the preforms are injection molded and stored before blowing the preforms to produce a container.

Figure 1:
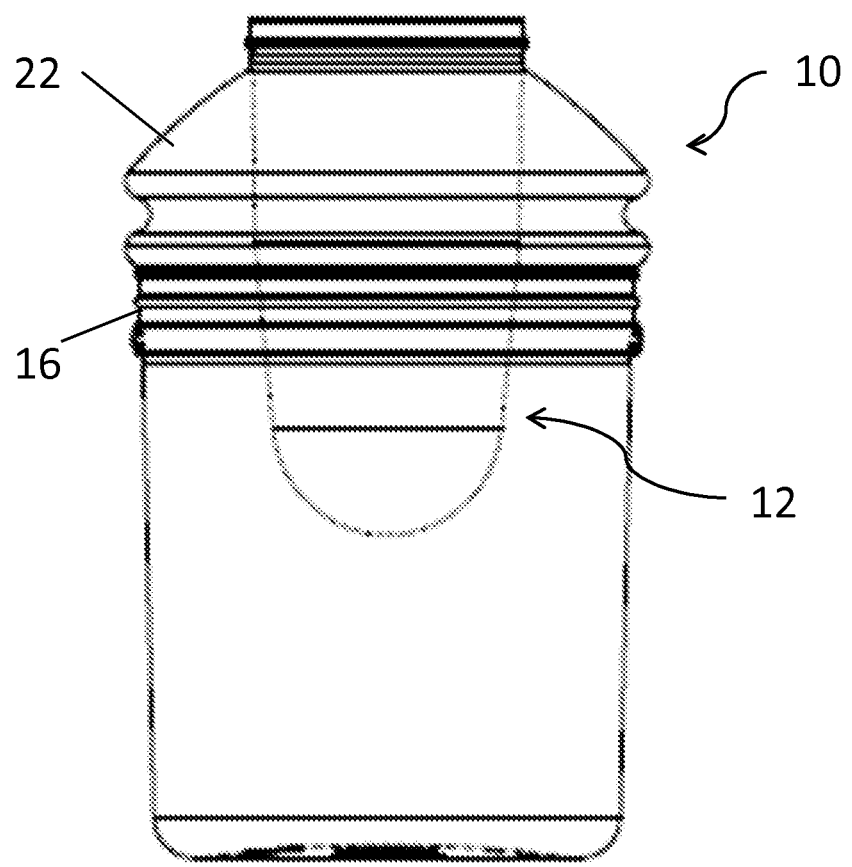
FIG. 1 shows a preform in accord with an exemplary embodiment superimposed on a container that is formed from the preform.
Figure 2:
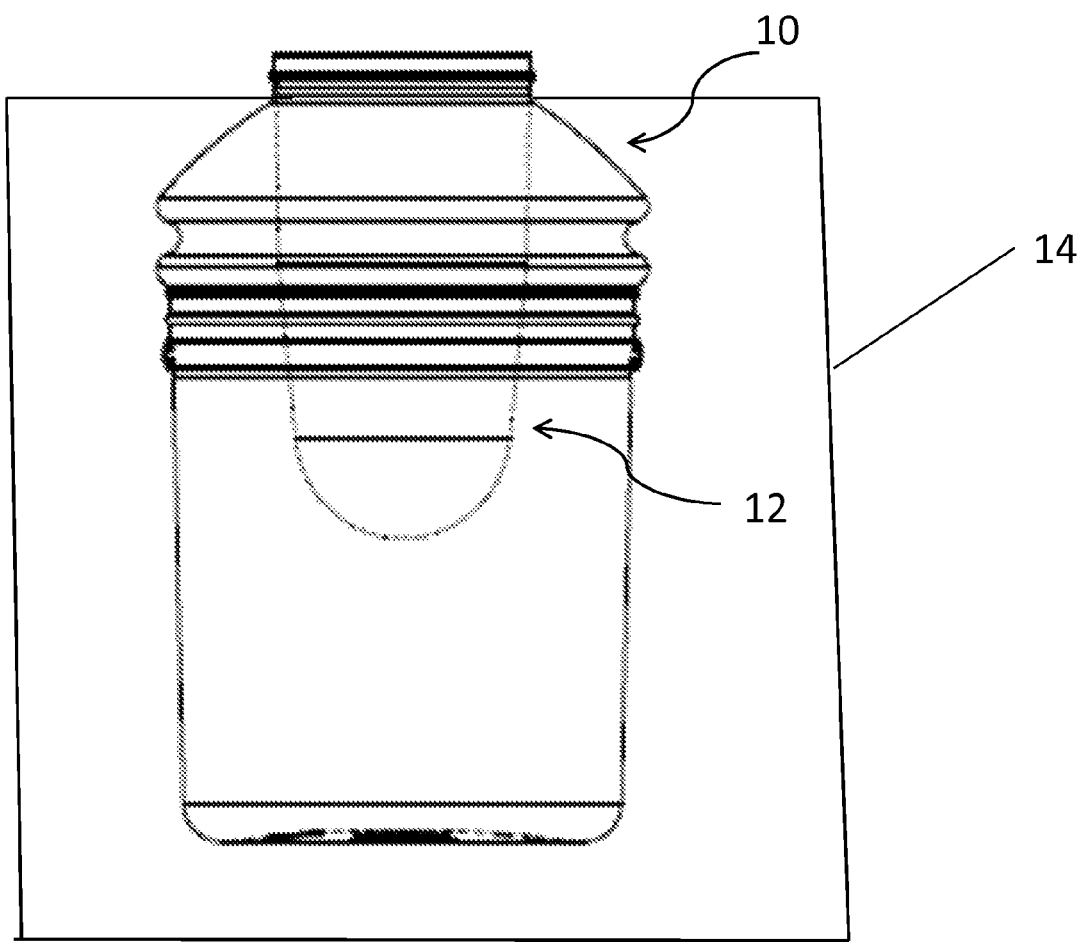
FIG. 2. Shows the preform an container of FIG. 1 with a mold cavity.
Figure 3:
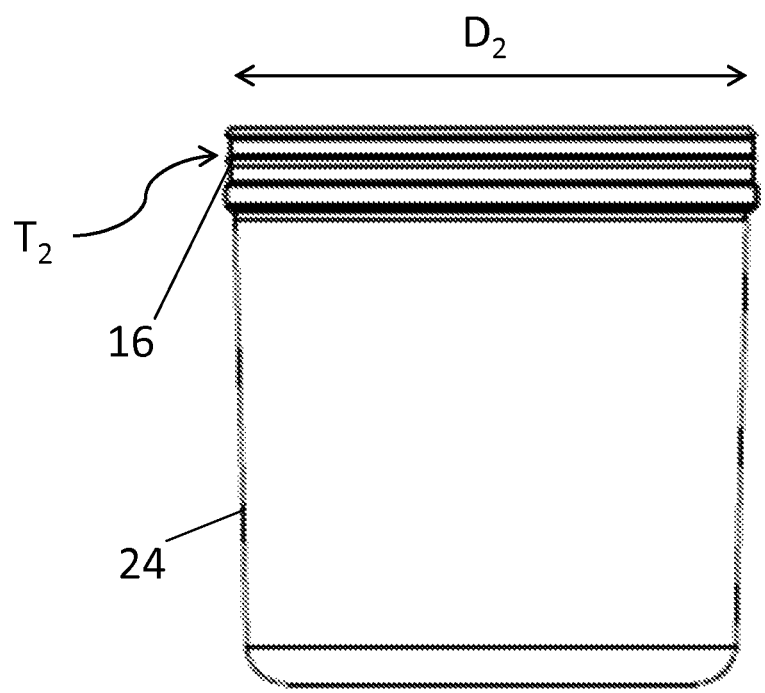
FIG. 3 shows a container formed in accord with an embodiment after the dome portion is trimmed from the container.

With reference to FIGS. 1-3, a finished container 10 in accordance with this embodiment is formed by injection molding a preform 12 and then placing the preform 12 into the cavity of a mold assembly 14 to be blown. As shown in FIG. 1, by injection molding a preform 12 having a smaller neck diameter than the neck portion of the finished container 10, the diameter of the opening at the top of the mold assembly is substantially reduced. As a result, more mold cavities may be placed in the blow machine to provide improved capacity.

Figure 4:
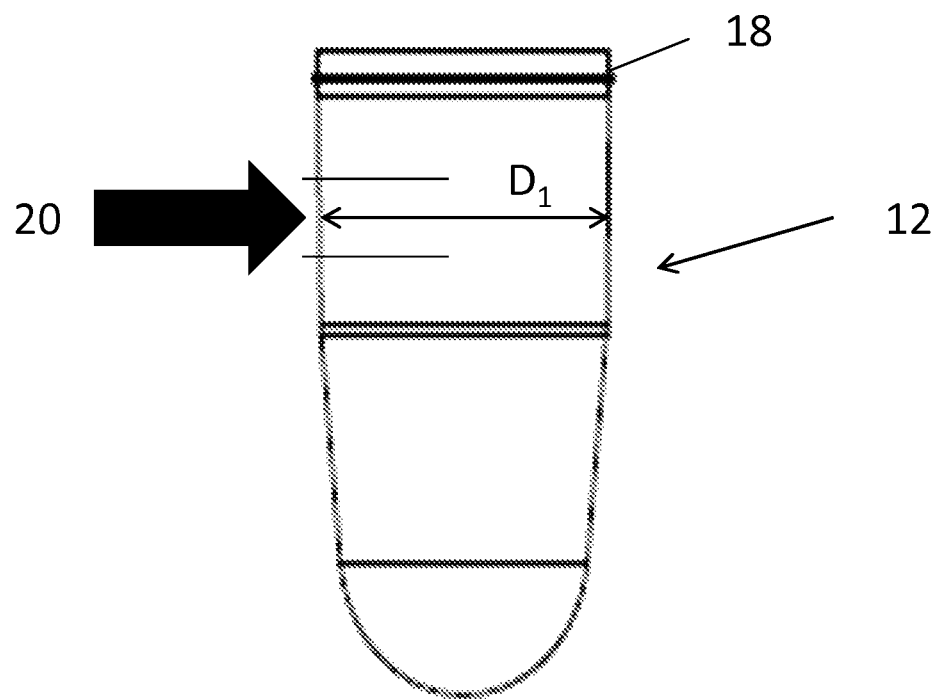
FIG. 4 shows a preform used to form the container of FIG. 3.
Figure 5:
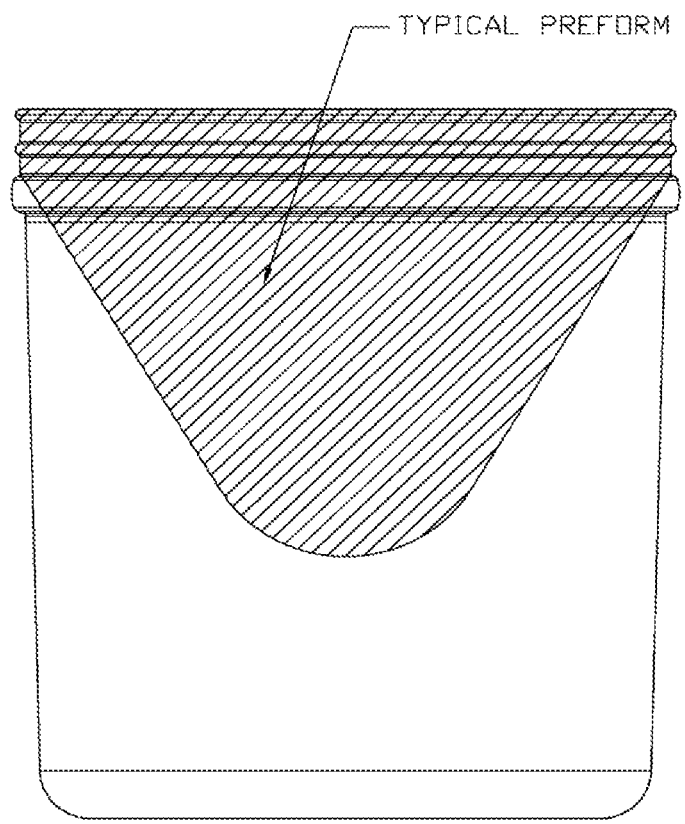
FIG. 5 shows a typical preform utilized in the related art.

As shown in FIG. 4, a preform 20 having a reduced diameter neck portion 18 (the diameter of the preform neck is substantially smaller than the neck of the finished container), is injection molded. Notably, preform 12 has a thread forming region 20 the includes a portion of the preform below the preform neck portion 18 that will press against the mold assembly 14 to form the snap fit portion 16 of the container 10. While the container 10 is produced here with a snap fit portion 16, the present invention is not so limited. Rather, the mold assembly may be configured to form spiral threads, a beaded rim or some other shape.

However, because of the strain hardening characteristics of PET, it is difficult to get a smaller diameter preform to conform to the design/shape of the snap fit portion 16 or threads of the mold assembly 14. To meet this balance, the amount of expansion of the preform during the blowing operation must be carefully controlled. For example, the thickness of the preform 12 in the preform thread forming region 20 must be designed taking this into account. Also, the thickness of the preform in other areas should be taken into consideration so that an acceptable container having appropriate thicknesses in other areas will be produced. Another consideration is the hoop ratio—the amount of change of the diameter of the thread forming region of the preform with respect to the original diameter.

In an example of this embodiment, a container 10 having a finished diameter of about 6 inches and a vertical height of about 7.25 inches (10.3 inches before trimming the dome portion 22) was produced. The diameter of snap fit portion 16 at the neck of the container 10 is substantially the same as or larger than the maximum diameter of the container 10. This bottle was produced from a preform having a diameter of about 3.3 inches in the thread forming region 20 and having a length of about 6.2 inches. With reference to FIGS. 3 and 4, the hoop ratio (ratio of the snap fit portion diameter $D_2$ to the diameter $D_1$ of the thread forming region 20) is 1.91 and preferably in the range of 1.85 to 1.95. In this case, the difference in the diameter between the thread forming region 20 and the diameter of the snap fit portion 16 is about 2.9 inches. This difference is preferably in the range of 2.5 to 3.5 inches. Additionally, the axial expansion along the axial direction (perpendicular to the diametrical direction) is 1.66, but this axial ratio may range from about 1.6 to about 1.8.

As noted above, the ratio of the thicknesses between the preform 12 and the blown container 10 is important to proper thread (snap fit portion) formation. In this example, the thickness of the of the preform in the thread forming region 20 (portion forming the snap fit portion) is about 0.14 inches. The thickness of the blown snap fit portion 16 on the finished container 10 is about 0.026 inches and the thickness of the thread forming region 20 before blowing is 0.14 inches. This results in a wall thickness ratio (expansion) of about 5.4. This resulted in good snap fit or thread formation.

However, the present invention is not so limited. Rather, satisfactory thread formation may result when the thickness of the blown snap fit portion 16 is preferably in the range of 0.029 to 0.020 inches. Thus, acceptable wall thickness ratios preferably range from 4.8 to 7, but more preferably 4.9 to 5.5.

Notably, because the threaded or snap fit portion is formed using the blow molding operation, the thickness is substantially less than when the threaded portion is formed on the preform neck by injection molding. In the example described above, this resulted in a weight savings of about 10-20 grams, on a 150 gram bottle or a percent weight savings of 10 to 20 percent by weight.

Figure 6:
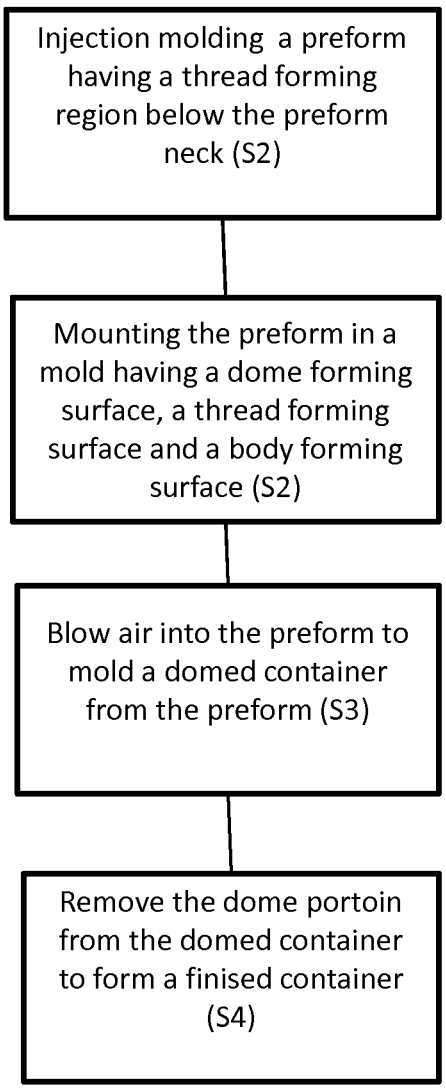
FIG. 6 is a flowchart describing a method of making a container.

A method of making a container in accord with an exemplary embodiment is described with reference to FIG. 6. First, a preform having a thread forming region 20 below the preform neck 18 is injection molded in operation S1. Then, the preform is inserted into a mold 14 having a dome forming surface, a thread forming surface and a body forming surface S2. Air is blown into the preform to mold a domed container S3 as shown in FIG. 2. Thereafter, the domed portion 22 is trimmed off of the container S4 to produce as finished container as shown in FIG. 3.

It is noted that when this process is performed on single stage equipment, the residual heat from the injection molding process remains in the preform through the blowing operation S3. This internal heat enhances thread forming (or other mold detail formation) during the blow molding operation. While this invention has been particularly shown and described with reference to exemplary embodiments thereof, the above description should be considered in as illustrations of the exemplary embodiments only and are not for purposes of limitation. Therefore, the scope of the invention is defined not by the detailed description of the invention but by the appended claims, and all differences within the scope will be construed as being included in the present invention.

What is claimed is:

1. A one stage method of making a blow-molded PET plastic container having an externally threaded wide-mouth finish, comprising:
    injection molding a preform having a body forming region, a neck forming region above the body forming region, and a dome forming region above the neck forming region;
    mounting the preform in a mold such that residual heat from the injection molding step remains in the preform when the preform is mounted in the mold, the mold including a surface having a neck forming surface to form a neck having a snap fit portion or a threaded portion;
    stretching the preform against the mold surface to form an intermediate article having a dome portion connected to a neck portion of the container, the dome portion comprising a flange and an annular groove that extends from a lip of the neck portion to the flange; and
    severing the dome portion from the neck portion at the annular groove using a spin trim operation to produce a wide mouth container,
    wherein the ratio of a wall thickness of the neck forming region of the preform to the wall thickness of the neck portion is ranges from 4.8 to 7.

2. The method of claim 1, wherein the ratio of the diameter of the container neck to the diameter of the region of the preform neck is approximately 1.85 to 1.95.

3. The method of claim 1, wherein a thickness of the neck portion lies in the range of 0.029 to 0.020 inches.

4. The method of claim 1, wherein the difference between the diameter of the neck forming region and the neck portion ranges from 2.5 to 3.5 inches.

5. The method of claim 1, wherein the difference between a diameter of the neck forming region and a diameter of the neck portion is about 2.9.

6. The method of claim 1, further comprising stretching the preform against a body forming surface of the mold to form a body portion of the intermediate article such that the wide mouth container comprises a body portion below the neck portion, the neck portion having a maximum diameter that is equal to or greater than that of the body portion.

7. The method of claim 1, wherein the wide mouth container comprises a body portion below the neck portion, the neck portion having a maximum diameter that is equal to that of the body portion.

8. The method of claim 1, wherein the wide mouth container comprises a body portion below the neck portion, the neck portion having a maximum diameter that is greater than that of the body portion.

9. The method of claim 1, wherein the wherein the ratio of a wall thickness of the neck forming region of the preform to the wall thickness of the neck portion is about 5.4.

10. The method of claim 1, wherein a height of the wide mouth container is about 1.6 to about 1.8 times greater than that of the preform.

11. The method of claim 1, wherein the flange has a maximum diameter that is equal to that of the lip.

12. The method of claim 1, wherein the dome portion has an outer surface that is concavely curved continuously from the lip to the flange, the concave outer surface defining the annular groove.

13. The method of claim 1, wherein the dome portion is tapered continuously from the flange to a lip of the dome portion.

14. The method of claim 13, wherein the lip of the dome portion defines an opening that extends through an uppermost surface of the dome portion.

15. The method of claim 1, wherein the annular groove has a minimum diameter that is less than that of the lip.

16. A one stage method of making a blow-molded PET plastic container having a snap fit wide-mouth finish, comprising:
    injection molding a preform having a body forming region, a neck forming region above the body forming region, and a dome forming region above the neck forming region;
    mounting the preform in a mold such that residual heat from the injection molding step remains in the preform when the preform is mounted in the mold, the mold including a surface having a neck forming surface to form a neck having a snap fit portion or a threaded portion;
    stretching the preform against the mold surface to form an intermediate article having a dome portion connected to a snap fit neck portion of the container and a body portion connected to the snap fit neck portion, a wall thickness of the snap fit neck portion being within the range of 0.029 to 0.020 inches, the dome portion comprising a flange and an annular groove that extends from a lip of the snap fit neck portion to the flange; and
    severing the dome portion from the snap fit neck portion at the annular groove to produce a wide mouth container in which the snap fit neck portion has a maximum diameter that is greater than or equal to that of the body portion, wherein the ratio of the diameter of the snap fit forming region of the preform to the diameter of the snap fit neck portion is in the range of 1.85 to 1.95.

17. The method of claim 16, wherein the difference between the diameter of the neck forming region and the neck portion ranges from 2.5 to 3.5 inches.

18. A one stage method of making a blow-molded PET plastic container having a snap fit wide-mouth finish, comprising:
   injection molding a preform having a body forming region, a neck forming region above the body forming region, and a dome forming region above the neck forming region;
   mounting the preform in a mold such that heat from the injection molding step remains in the preform when the preform is mounted in the mold, the mold including a neck forming surface and a body forming surface;
   stretching the preform against the neck forming surface and the body forming surface to form an intermediate article having a dome portion connected to a snap fit neck portion of the container and a body portion connected to the snap fit neck portion, the dome portion comprising a flange and an annular groove that extends from a lip of the snap fit neck portion to the flange; and
   severing the dome portion from the snap fit neck portion at the annular groove to produce a wide mouth container in which a maximum diameter of the snap fit neck portion is equal to or greater than that of the body portion,
   wherein the heat from the injection molding step remains in the preform as the preform is stretched against the forming surfaces.

19. The method of claim 18, wherein a wall thickness of the snap fit neck portion is within the range of 0.029 to 0.020 inches.

20. The method of claim 18, wherein the ratio of the diameter of the snap fit forming region of the preform to the diameter of the snap fit neck portion is in the range of 1.85 to 1.95.

* * * * *